March 6, 1962  B. BARÉNYI  3,024,060
TRANSVERSE BRACE FOR MOTOR VEHICLES
Filed May 23, 1955  2 Sheets-Sheet 1
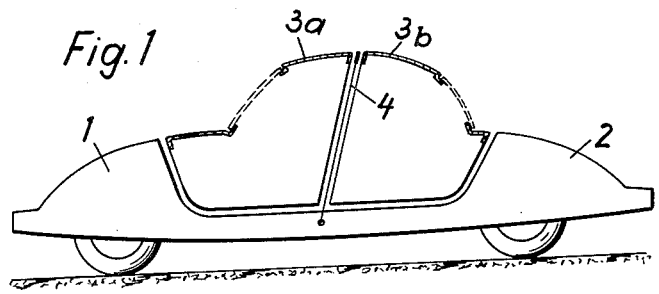
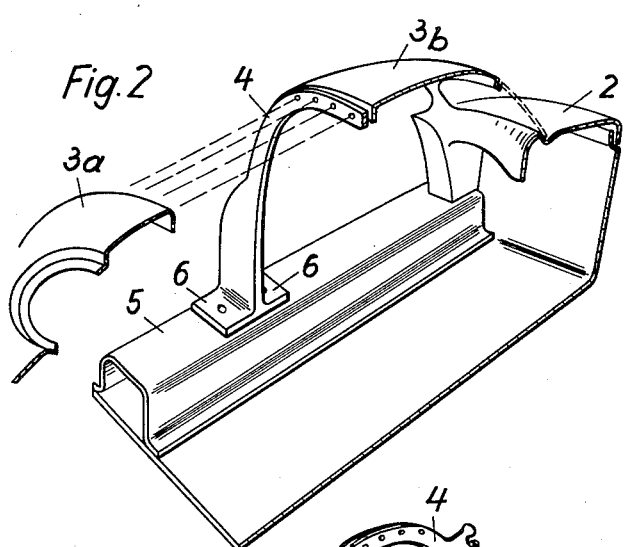
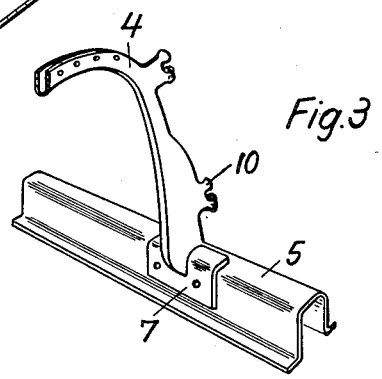
INVENTOR
BÉLA BARÉNYI
BY *Dicke and Craig*
ATTORNEYS.

March 6, 1962 — B. BARÉNYI — 3,024,060
TRANSVERSE BRACE FOR MOTOR VEHICLES
Filed May 23, 1955 — 2 Sheets-Sheet 2

INVENTOR
BÉLA BARÉNYI
BY Dicke and Craig.
ATTORNEYS.

United States Patent Office 3,024,060
Patented Mar. 6, 1962

3,024,060
TRANSVERSE BRACE FOR MOTOR VEHICLES
Béla Barényi, Steckfeldstrasse 16, Stuttgart-Hohenheim,
Germany
Filed May 23, 1955, Ser. No. 510,195
In Germany Jan. 10, 1949
Public Law 619, Aug. 23, 1954
Patent expires Jan. 10, 1969
14 Claims. (Cl. 296—28)

The present invention relates to a motor vehicle which is provided with a transverse bracing member for supporting thereon the outer covering of the vehicle body formed by body panels.

It is an object of the present invention to provide a motor vehicle, the body of which is composed of at least two separate parts or sections.

Another object of the present invention is to provide a subdivided body for a motor vehicle which may be produced at a considerably lower expense than the conventional one-piece body structures.

It is a further object of the present invention to provide a motor vehicle with a body which preferably consists of two separate sections and wherein these sections may be secured to a transverse bracing bearer member without any special connecting elements.

Another object of the invention is to provide a motor vehicle which includes an upper body made of at least two separate sections, consisting of plexiglas, which are connected with each other in a suitable manner by means of a transverse bracing bearer member.

A further object of the invention is to provide a transverse bracing bearer member in the shape of an inverted, substantially U-shaped element having essentially the form of a bow which is open toward the bottom and the ends of which are suitably designed so as to be mounted on or secured to the bottom of the body or of the frame thereof by being riveted or welded thereto, by encompassing or embracing a part thereof, or by being inserted therein.

Another object of the present invention is to provide a transverse bracing bearer member to serve both as a connecting member for connecting the two or more separate parts of the body, as well as for supporting said body and maintaining the shape thereof.

A preferred feature of the present invention resides in its application to automobiles and other vehicles which are built in accordance with the cellular system of construction. In such a case, the transverse bracing or bearer member is preferably arranged substantially at the center of the cell constituting the passenger compartment, that is, in three-cell vehicles, in the middle of the central or passenger cell. Consequently, those parts of the car body which have to be made of one piece will be quite small and may thus be made rather easily and at a low cost. At the same time, the transverse bearer member may then also be used as a supporting member of the door.

Another feature of the invention is that the bracing member may be made in a variety of different shapes, strengths, and designs suitable for the particular purpose, that is, for example, of solid material by making it in the form of a strip of metal standing edgewise, of inverted T-shape, or the like, or by making it of tubular or trough-shaped cross section.

The manner of mounting the separate adjacent sections of the car body on the transverse member will largely depend upon the material of which these sections consist. Thus, if they are made of sheet steel, the parts will preferably be riveted or welded; if they consist of molded plastic, they will be riveted or bolted, while when made of Plexiglas, it is advisable to make the transverse member of tubular or trough-shaped cross section and to secure the Plexiglas sections thereto by means of clamps with interposed layers or cushions of rubber or the like.

Also, the shape of the bracing or bearer member may be entirely or partly in conformity with the cross-sectional shape of the car body, or it may have a shape different therefrom and, for example, be set off a certain distance from the walls of the car body and only be secured thereto by projecting arms to the parts of the body to be connected thereby.

Further objects, features, and advantages of the present invention will be apparent from the following detailed disclosure thereof, as well as from the accompanying drawings, in which:

FIG. 1 shows a diagrammatic longitudinal section through an automobile designed and constructed according to the present invention;

FIG. 2 is a perspective view of the roof and body structure according to the invention;

FIG. 3 shows a modification of the bracing member according to the invention; while

Figure 4:
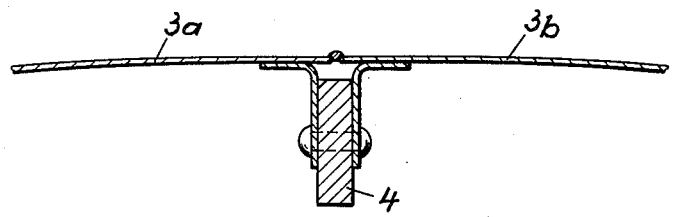
FIGS. 4 to 7 shows several cross-sectional shapes which the bracing or bearer member may assume in accordance with the specific requirements in each case.

Referring to the drawings, FIG. 1 shows the design of an automobile built according to the cellular-type of construction to which the present invention is particularly applicable without, however, being restricted thereto. It consists of the front cell 1, the rear cell 2, and the central cell which is shown as being made of two separate sections 3a and 3b which are divided in the middle and form separate stampings. Thus, the two stampings of this central cell are of relatively small size, may be easily handled and may be made at a relatively low cost as they may be manufactured with much more simple means than if the entire cell has to be made of one piece. Intermediate the two separate sections 3a and 3b and preferably in the middle of the entire cell, the present inveniton provides a transverse bracing and connecting bearer member 4 which, as more clearly shown in FIGS. 2 and 3 is designed as a substantially U-shaped element which may be mounted, for example, on the longitudinal lateral bearer members or channel arms 5 of the car frame disposed in the lower part of the passenger compartment, for example, near the floorboard thereof, as shown in FIGURE 2.

Such mounting may be carried out as shown in FIG. 2 simply by placing the flanged ends 6 from above upon the longitudinal bearer member or channel arm 5 and by either bolting, riveting, or welding them thereto. However, if desired, the lower end of the member 4 may also be provided with a suitable bracket 7 which may fit over two sides of the longitudinal bearer member or channel arm 5 as shown in FIG. 3 or may be made of U-shaped form of a size and shape similar to the longitudinal bearer member or channel arm 5 so as to fit over it similar to a saddle.

Figure 5:
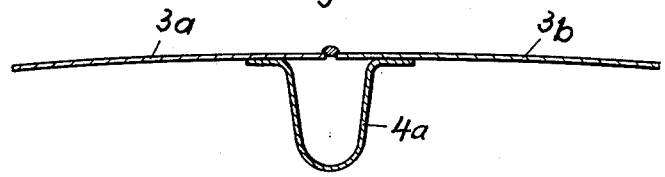
Figure 6:
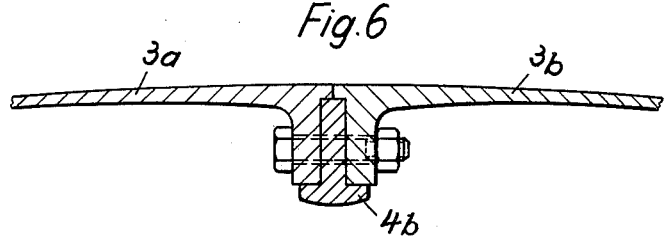
Figure 7:
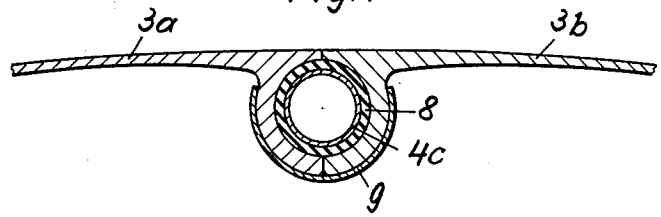

The particular size and shape of the bracing or bearer member 4 may be made in any way as desired and may depend upon the particular shape and design of the car body, the material of which the two sections 3a and 3b are made, and the bracing strength which the member 4 is supposed to lend to the body. It may also be, for example, of flat material or of profile shape having a solid cross section, standing edgewise, as shown in FIGS. 1 to 4, of inverted T-shaped cross section, as shown in FIG. 6, where the bracing member is designated by reference numeral 4a, of trough-shaped cross section, as shown in FIG. 5, where the bracing member is designated by reference numeral 4b, or of round or any other tubular shape as shown in FIG. 7, where the bracing member is designated by reference numeral 4c.

The manner of mounting the two separate body sections 3a and 3b of the car body on the bracing members 4, 4a, 4b, and 4c will to some extent also depend upon the material thereof. Thus, if the two sections are made of sheet metal, they may be welded or riveted to member 4, while, if made of molded synthetic material they would preferably be bolted thereto. If one or both sections 3a and 3b should consist of Plexiglas, it may be advisable to choose a substantially tubular bracing member 4c, as shown in FIG. 7, and to clamp the Plexiglas portions thereto by means of steel clamps 9 with a layer 8 of rubber or similar material being interposed between the Plexiglas and the bracing member 4.

The bracing or bearer member 4 may also serve at the same time as a support for the door hinges and as a part of the door frame of the car. The particular manner of securing the hinges will depend upon the material and cross-sectional shape of the bracing member 4, that is, the hinges may either form an integral part 10 of the bracing member 4 as shown in FIG. 3 or be mounted thereon in any suitable manner.

Although my invention has been illustrated and described with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. In a motor vehicle having frame means and a vehicle body made of at least two separate sections subdivided along an essentially transversely extending vehicle plane, said vehicle body including separate outer covering panels forming also roof portions and subdivided along said essentially transversely extending vehicle plane, and a transverse bearer member for bracing there against and supporting thereon said outer covering panels, said transverse bearer member being rigidly secured to said frame means and disposed in said essentially transversely extending vehicle plane and effectively connecting said two vehicle body panel sections with each other along said outer covering panels.

2. In a motor vehicle the combination according to claim 1, wherein said transverse bearer member is essentially bow-shaped open towards the bottom thereof and at least partly coinciding in shape with the shape of said body.

3. In a motor vehicle the combination according to claim 1, wherein said frame means includes longitudinal bearer members disposed near the floor plane of the motor vehicle, said transverse bearer member being constructed as a bow-shaped member open towards the bottom thereof and provided with complementary-shaped end portions surrounding said longitudinal bearer members at least on one side thereof, and bolt means for securing said end portions to said longitudinal bearer members in essentially said floor plane.

4. In a motor vehicle the combination according to claim 1, wherein said transverse bearer member includes means to simultaneously serve as door supporting member.

5. In a motor vehicle the combination according to claim 1, wherein said body panels are made of synthetic material, and wherein said transverse bearer member has a tubular cross section.

6. In a motor vehicle the combination according to claim 1, wherein said body panels are made of synthetic material, and further comprising means for clamping said synthetic material panel sections to said transverse bearer member.

7. In a motor vehicle the combination according to claim 1, wherein said body panels are made of sheet-metal steel, and wherein said sheet-metal steel panels are connected to said transverse bearer member.

8. In a motor vehicle the combination according to claim 1, wherein said body panels are made of plastic material and are connected to said transverse bearer member.

9. In a motor vehicle the combination according to claim 1, wherein said transverse bearer member is of profile-shaped cross section.

10. In a multi-cellular type motor vehicle having a plurality of separate cells including a center cell, the combination according to claim 1, wherein the center cell forms the passenger compartment, and wherein said transverse bearer member is located essentially in the center of said center cell, said panels also constituting part of the vehicle body of said center cell.

11. In a motor vehicle the combination according to claim 1, wherein said panels form part of the vehicle roof of a passenger motor vehicle, said roof being also subdivided into two separate parts along said essentially transversely extending vehicle plane.

12. In a motor vehicle the combination according to claim 11, wherein said roof panels are made of synthetic material and further comprising clamping means for securing said panels to said transverse bearer member.

13. In a motor vehicle having a body made of at least two separate body sections subdivided along an essentially transversely extending vehicle plane and frame means including hollow bearer members disposed near the floor plane of the vehicle, said vehicle body including separate outer covering panels forming also roof portions and subdivided along said essentially transversely extending vehicle plane, and a transverse bearer member for bracing thereagainst and supporting thereon said outer covering panels, said transverse bearer member being disposed in said essentially transversely extending vehicle plane and effectively connecting said two vehicle body panel sections with each other along said outer covering panels, and said transverse bearer member being directly secured to a respective bearer member of said frame means.

14. In a motor vehicle having means effectively forming an underframe, a vehicle top made of two shaped body panels and including a front portion and a rear portion, said top being subdivided into said two separate portions within an essentially transversely extending plane subdividing said top over the entire width thereof, and transverse bearer means secured to said underframe and including means for effectively connecting said two portions with each other, said transverse bearer means extending from one side of the vehicle to the other and substantially following the shape of said body panels within said transversely extending plane, each of said portions consisting of a separately made body panel.

References Cited in the file of this patent

UNITED STATES PATENTS

| | | |
|---|---|---|
| 1,365,211 | Trinca | Jan. 11, 1921 |
| 1,650,203 | Froesch | Nov. 22, 1927 |
| 1,822,775 | Henninger | Sept. 8, 1931 |
| 1,953,515 | Smith | Apr. 3, 1934 |
| 1,983,497 | Henninger | Dec. 4, 1934 |
| 1,998,528 | Smith | Apr. 23, 1935 |
| 2,007,255 | Rohr | July 9, 1935 |
| 2,039,233 | MacFarlane | Apr. 28, 1936 |
| 2,223,740 | Quest | Dec. 3, 1940 |
| 2,242,269 | Siebler | May 20, 1941 |
| 2,425,948 | Lucien | Aug. 19, 1947 |
| 2,556,062 | Buehrig | June 5, 1951 |
| 2,702,206 | Barényi | Feb. 15, 1955 |

FOREIGN PATENTS

| | | |
|---|---|---|
| 530,861 | France | Oct. 11, 1921 |
| 588,088 | France | Jan. 26, 1925 |
| 486,968 | Great Britain | June 14, 1938 |
| 597,966 | Great Britain | Feb. 6, 1948 |